Patented May 25, 1948

2,442,059

UNITED STATES PATENT OFFICE 2,442,059

RUBBERY BUTYL GUM-DIMETHYL POLY-SILOXANE GUM COMPOSITION

Moyer M. Safford, Schenectady, N. Y., assignor to General Electric Company, a corporation of New York No Drawing. Application May 29, 1946, Serial No. 673,148

9 Claims. (Cl. 260—45.5)

This invention relates to new compositions of matter and methods for obtaining the same. More particularly, the invention is concerned with a process of decreasing the nerve of butyl gum which comprises intimately dispersing a dimethyl polysiloxane gum (dimethyl silicone gum) in the butyl gum in an amount equal to from about 1 to 10 per cent, by weight, of the butyl gum.

The term "butyl gum" (this term is preferable to butyl rubber), as employed herein and in the appended claims, is intended to mean, broadly, a solid rubbery copolymer or interpolymer comprising the product of polymerization of a mass of copolymerizable materials containing, by weight, a major proportion of low molecular weight olefin (monoolefin), more particularly an isoolefin, e. g., isobutylene (isobutene), 2-ethyl butene-1, etc., and a minor proportion of low molecular weight conjugated diolefin, e. g., butadiene, isoprene, cyclopentadiene, pentadiene-1,3, hexadiene-2,4, etc. More specific examples of butyl gums embraced by the above definition are those wherein the amount of diolefin present is from about 2 to 5 per cent, by weight, of the total weight of the monoolefin and the diolefin. Such synthetic materials, which are available to the trade under such name as GR–1, are described more fully, for example, in the 1945 issue of Plastics Catalogue, pages 1050–1055, published by the Plastics Catalogue Corporation, New York, N. Y. Additional descriptions of butyl gum and its properties will be found in "Modern Synthetic Rubbers" by Harry Barron, published in 1944 by D. Van Nostrand Company, New York, N. Y., and in the "Symposium on the Applications of Synthetic Rubbers," Cincinnati Spring Meet of the American Society for Testing Materials, held March 2, 1944, and published by the same Society in June 1944.

Reference also is made to Thomas et al. Patent No. 2,356,128, issued August 22, 1944, for more detailed information concerning isoolefin-diolefin interpolymer compositions, their properties and method of preparation and curing. Typical of the compositions disclosed by Thomas et al. is a synthetic solid, plastic hydrocarbon interpolymer of a major proportion of an isoolefin having less than 8 carbon atoms per molecule and a minor proportion of a conjugated diolefin having from 4 to 8, inclusive, carbon atoms per molecule, which interpolymer is characterized by low saturation as evidenced by an iodine number below 50, a molecular weight above 15,000, an approximate specific gravity of 0.91 and a reactivity with sulphur to yield a product of increased elasticity.

One of the objects of this invention is to decrease the "nerve" or tendency of a distorted sample of the butyl gum to return to its original shape when the distorting force is removed. The meaning of the term "nerve" will be more apparent from the discussion and examples which follow.

Another object of this invention is to decrease the nerve of butyl gum in order that smaller volume loadings of pigment can be used and thereby obtain more plastic (softer) products which will extrude in smooth forms without there being present a rippled effect on the outer surface of the extruded article due to the excessive nerve characteristics of the butyl gum. Moreover, a smaller volume of pigmentation loading permits better utilization of the outstanding stability and electrical properties of the pure butyl gum. Furthermore, excessive loading or pigmentation of the butyl gum necessitates the use of softeners which, together with the increased amounts of loading, reduces the quality of the compound, changes its characteristics and causes an extended rate of cure which often results in products too plastic to retain their shape during cure.

A further object of the present invention is to increase the cohesion of the butyl gum and prevent "lacing" (crumbling and falling from the mill or rolls) of the gum during mastication on a mill (compounding rolls) thereby to form smooth sheets more easily and in less time on the rolls.

Still another object of this invention is to decrease the sticking of the butyl gum to the compounding rolls without reducing the tack properties necessary to form a smooth, adhering sheet on the rolls. The tack properties are also essential to enable the butyl gum to accept and retain the ingredients desired to be introduced into the butyl gum while the latter is being masticated on the rolls.

Various attempts have been made to overcome the aforementioned difficulties encountered in the processing or compounding of butyl gum itself or in the preparation of butyl elastomers (rubbers) containing fillers, including pigments, and/or other ingredients, as, for instance, vulcanizing agents, extenders, etc.

One method comprises loading the butyl gum with an amount of filler, e. g., from 40 per cent to 50 per cent clay, based on the weight of the butyl gum, sufficient to decrease adequately the nerve of the butyl gum. However, this excessive amount of filler alters the properties of the butyl gum to such an extent that the applications for which such a product may be used are limited. Liquid compositions, when employed to overcome the defects discussed in the objects of this invention, have been generally unsuccessful because of the large amount required and because of their deleterious effect on the cure and on the physical properties and characteristics of the cured objects.

I have discovered that by incorporating into the butyl gum from about 1 to 10 per cent, preferably about 3 to 10 per cent, by weight, of a dimethyl silicone gum (dimethyl polysiloxane gum), I am able to substantially decrease the nerve of the butyl gum thereby permitting normal processing, compounding, extrusion, and calendering of the gum without essentially changing its properties or the properties of butyl elastomers or rubbers prepared therefrom.

The term "dimethyl polysiloxane gum" or "dimethyl silicone gum" as referred to herein and in the appended claims, is intended to mean and include the following: The product obtained by treating, preferably under heat, a low molecular weight dimethyl silicone, comprised substantially of dimethyl siloxane units, with various catalysts suitable for such purpose to yield a substantially non-pourable mass (of higher molecular weight than the original dimethyl silicone), the properties of which may range from a soft, pliable, taffy-like, putty-like mass to a composition of matter exhibiting a good degree of elasticity and resiliency. The methyl-to-silicon ratio present in these dimethyl silicones may range from about 1.98 to 2.00, more particularly from 1.995 to 2.0 methyl groups per silicon atom, depending on the ingredients employed in the preparation of the dimethyl silicone. Mixtures of the soft, plastic, pliable, non-elastic type dimethyl polysiloxane gums with the elastic, resilient type are also included within the aforementioned definition. Although the term "gum" as employed in the ordinary sense may include hard, brittle, resinous materials, I intend to exclude from my definition of "dimethyl silicone gum" (or "dimethyl polysiloxane gum") materials which are hard or brittle.

The dimethyl silicone gums employed in the practice of this invention may be obtained by various methods. Detailed methods of preparing these materials are set forth, for example, in the copending applications of James G. E. Wright, Serial Nos. 532,879 and 532,880, now Patent No. 2,426,912, both filed April 26, 1944, and Serial No. 569,647, filed December 23, 1944; in the application of Maynard C. Agens, Serial No. 526,473, filed March 14, 1944, and in the application of James Marsden and George F. Roedel, Serial No. 598,913, filed June 11, 1945, all of which applications are assigned to the same assignee as the present invention.

For example, a dimethyl silicone gum may be prepared by treating a liquid dimethyl polysiloxane (dimethyl silicone), with a suitable metal halide, e. g., ferric chloride hexahydrate as set forth in the aforementioned application Serial No. 526,473, (supra), or a material comprising essentially a dimethyldihalogenosilane, e. g., dimethyl dichlorosilane, may be hydrolyzed under suitable conditions with a salt of a metal of the first and second class of the periodic table as set forth in application Serial No. 532,880 (supra). The liquid, low molecular weight, dimethyl polysiloxanes are prepared, for instance, by hydrolyzing a substantially pure dimethyldihalogenosilane or a dimethyl dihalogenosilane containing up to about two mol per cent of a monomethyl trihalogenosilane. Stated alternatively, the aforementioned liquid polysiloxanes may be considered as being polymeric dimethylsiloxane containing up to 2 mol per cent copolymerized monomethyl-siloxane. When a substantially pure dimethyl dihalogenosilane, e. g., dimethyl dichlorosilane, is used to prepare the liquid dimethyl polysiloxane, a dimethyl polysiloxane gum (dimethyl silicone gum) is obtained therefrom having a methyl-to-silicon ratio of substantially 2 to 1. On the other hand, when a hydrolysis product of a dimethyl dihalogenosilane containing small amounts (of the order of 0.5 up to about 2 mol per cent) of a methyl trihalogenosilane, more specifically, methyl trichlorosilane, is employed in the preparation of the dimethyl polysiloxane gum, the product obtained therefrom has a methyl-to-silicon ratio of at least about 1.98, but less than 2 methyl groups per silicon atom. The terms "dimethyl polysiloxane gum" or "dimethyl silicone gum" is intended to include within its definition methyl polysiloxane gums in which all or substantially all of the silicon atoms are each connected to two methyl groups. Preferably, the limits of the methyl-to-silicon ratios are those disclosed above.

More specific directions for making some of the liquid, low molecular weight, polymeric dimethyl siloxanes (liquid dimethyl polysiloxanes) used in the preparation of the dimethyl silicone gums may be found, e. g., in the copending applications of Winton I. Patnode, Serial Nos. 463,813, and 463,815, which applications were filed October 29, 1942, and assigned to the same assignee as the present invention.

Any of the methods familiar to those skilled in the art may be employed for incorporating the dimethyl silicone gum in the butyl gum. One method comprises milling the butyl gum on a set of differential rolls, i. e., rolls travelling at different rates of speed, for a short period of time, for instance, from about 1 to 3 minutes, at normal or slightly elevated temperatures, and thereafter adding the dimethyl silicone gum to the butyl gum while still masticating the latter on the rolls until an intimate dispersion of the two gums is obtained. Whereas before the addition of the dimethyl silicone gum, the butyl gum is noncoherent and lacy, i. e., incapable of forming a continuous sheet, as soon as about one per cent, by weight, of the dimethyl silicone gum (based on the weight of the butyl gum) is added to the butyl gum on the rolls, a sheet begins to form more readily and the lacy effect as well as the undesirable snap or nerve of the butyl gum decreases. As more of the silicone gum is added, up to about 10 per cent, by weight, of the butyl gum, a smooth, coherent, continuous sheet is formed on the rolls. At this stage, various fillers and other ingredients usually employed in rubber processing may be easily dispersed in the mixture of butyl and dimethyl silicone gums.

If substantially less than 1 per cent of the dimethyl silicone gum is employed, the effect on the butyl gum is materially decreased, while if more than 10 percent of the dimethyl silicone gum is used, no material advantage is derived. Amounts of the dimethyl silicone gum substantially in excess of 10 percent tend to give a softer, more flexible butyl product, the strength properties of which begin to show a decrease.

In order that those skilled in the art may better understand how the present invention may be practiced, the folowing examples are given by way of illustration and not by way of limitation. All parts are by weight.

In the following examples, the butyl gum employed comprised these ingredients:

| | Parts |
|---|---|
| Butyl gum (copolymer of approximately 98 per cent isobutylene and 2 per cent butadiene) | 1000 |
| Zinc oxide | 50 |
| Stearic acid | 30 |
| Tetramethylthiuram disulfide | 10 |
| Mercaptobenzothiazole | 5 |
| Sulfur | 20 |

*Example 1*

Approximately 90 parts butyl gum was rolled at room temperature on differential rubber rolls in an attempt to obtain a smooth sheet. At the start the mass exhibited a lace-like effect. After about 20 minutes milling the material was tenacious, and had an undesirable amount of elasticity and snap. When an attempt was made to cut the sheet, it snapped back to a knotty mass, and could not be worked satisfactorily.

*Example 2*

In this example, 90 parts butyl gum was rolled at room temperature on the differential rubber rolls for about one minute and thereafter a dimethyl polysiloxane gum (dimethyl silicone gum) of the elastic type [made in accordance with the concept embodied in application Serial No. 526,-473, using ferric chloride hexahydrate as the condensing agent (supra)] was incorporated in the butyl gum being rolled on the differential mills. As the first particles of the dimethyl silicone gum became dispersed in the butyl gum, the latter began to smooth out into a coherent solid sheet and the snap and nerve noticed in Example 1 began to lessen. When about 10 per cent, by weight, of the dimethyl silicone gum, based on the weight of the butyl gum, was intimately dispersed in the butyl gum, a smooth, coherent, adherent, but not sticky, sheet was present on the rolls. Less than 10 minutes were required to obtain this smooth sheet. This sheet could be cut and worked in the usual satisfactory manner familiar to those skilled in the art.

*Example 3*

As in the preceding examples, approximately 90 parts of the butyl gum was rolled on the differential mills for a short time. Finely divided clay was then added in small amounts until a substantially smooth sheet was obtained similar to the one obtained in Example 2. At the start of the milling, when about 10 per cent clay, by weight, of the butyl gum was added, the composition on the rolls was very stringy, somewhat crumbly, lacy, and still possessed most of the nerve present in the unfilled material. Slight improvement was noticed when about 20 per cent had been added, although the stringiness was still present. When approximately 40 per cent clay had been added to the butyl gum, a satisfactory sheet was formed on the rolls; however, this sheet was still inferior to the sheet prepared in Example 2 using only 10 per cent of the dimethyl silicone gum. Moreover, there was still some stringiness present in the sheet and the sheet was stiffer and less plastic than the sheet obtained in Example 2. Approximately 20 minutes were required to adequately disperse the clay in the butyl gum.

*Example 4*

In this example approximately 10 per cent, by weight, of a dimethyl silicone gum was added to butyl gum on the differential rolls in the same manner as in the preceeding examples. The dimethyl silicone gum used was of the plastic, soft, pliable, non-elastic type prepared according to the method disclosed in Wright application, Serial No. 569,647 (supra), using pyroboric acid as the condensing agent for the lower molecular weight, liquid dimethyl silicone (liquid dimethyl polysiloxane). The sheeting properties of the butyl gum began to improve when about one per cent, by weight, of the dimethyl silicone gum was dispersed in the butyl gum. When the completely dispersed dimethyl silicone gum was present in the butyl gum in an amount equal to about 10 per cent, by weight, of the butyl gum, a smooth coherent sheet was present on the rolls. The total rolling time required was only about 10 minutes.

Samples of the rolled compositions of matter prepared in Examples 2 (10 per cent, by weight, dimethyl silicone gum) and 3 (40 per cent, by weight, clay) were molded under heat and pressure into the shape of a flat sheet using a molding cycle of 155° C. for 15 minutes at a pressure of about 500 pounds per square inch. Under comparable testing conditions, the tensile strengths of the two tested materials were practically the same, namely, about 2200 pounds per square inch. However, the Shore durometer hardness on the A scale of the former composition (Example 2) was 22 while that of the latter composition (Example 3) was about 45, thus showing that the sample prepared in Example 2 was much softer than the one containing the clay.

From the foregoing examples, it is apparent that easier and quicker processing of butyl gums and rubbers can be accomplished by means of my invention than has heretofore been possible without any substantial sacrifice in the strength or softness of the final product.

What I claim as new and desire to secure by Letters Patent of the United States is:

1. In the process of milling a solid, rubbery hydrocarbon copolymer comprising the product of polymerization of a polymerizable mass comprising, by weight, a major proportion of an isomonoolefin having less than 8 carbon atoms per molecule and a minor proportion of a conjugated diolefin having from 4 to 8 carbon atoms per molecule, the step of decreasing the nerve of the said hydrocarbon polymer which comprises intimately dispersing a solid, elastic, polymerized methyl-substituted polysiloxane having an average ratio of from 1.98 to 2.0 methyl groups per silicon atom and being the product of condensation of a liquid, polymeric dimethyl-siloxane containing up to 2 mol per cent copolymerized monomethylsiloxane in the said hydrocarbon copolymer, in an amount equal to from 1 to 10 per cent, by weight, of the hydrocarbon copolymer.

2. In the process of milling a solid, rubbery hydrocarbon copolymer obtained by polymerizing a mass containing an isomonoolefin having less than 8 carbon atoms per molecule and a conjugated diolefin having from 4 to 8 carbon atoms per molecule in amounts corresponding to, by weight, from 95 to 98 per cent of the former and from 2 to 5 per cent of the latter, the step of decreasing the nerve of the said hydrocarbon copolymer which comprises intimately dispersing a solid, elastic, polymerized methyl-substituted polysiloxane having an average ratio of from 1.98 to 2.0 methyl groups per silicon atom and being the product of condensation of a liquid polymeric dimethylsiloxane containing up to 2 mol per cent copolymerized monomethyl siloxane in the said hydrocarbon copolymer, in an amount equal to from 1 to 10 per cent, by weight, of the hydrocarbon copolymer.

3. In the process of milling a solid, rubbery, hydrocarbon polymeric material comprising the product of polymerization of copolymerizable ingredients comprising, by weight, a major proportion of isobutylene and a minor proportion of butadiene, the step of decreasing the nerve of the said polymeric material which comprises intimately dispersing a solid, elastic, polymerized, methyl-substituted polysiloxane having an average ratio of from 1.98 to 2.0 methyl groups per silicon atom and being the product of condensation of a liquid polymeric dimethyl-siloxane containing up to 2 mol per cent copolymerized monomethylsiloxane, in the said hydrocarbon polymeric material in an amount equal to from 1 to 10 per cent, by weight, of the said hydrocarbon polymeric material.

4. In the process of milling a solid, rubbery, hydrocarbon polymeric material comprising the product of polymerization of copolymerizable ingredients comprising, by weight, 98 per cent isobutylene and 2 per cent butadiene, the step of decreasing the nerve of the said polymeric material which comprises intimately dispersing a solid, elastic, polymerized, methyl-substituted polysiloxane having an average ratio of from 1.98 to 2.0 methyl groups per silicon atom and being the product of condensation of a liquid polymeric dimethylsiloxane containing up to 2 mol per cent copolymerized monomethylsiloxane, in the said hydrocarbon polymeric material in an amount equal to from 1 to 10 per cent, by weight, of the said hydrocarbon polymeric material.

5. The step as in claim 4 wherein the solid, elastic methyl-substituted polysiloxane is the solid, elastic condensation product obtained by condensing, with ferric chloride hexahydrate, the liquid hydrolysis product of dimethyl dichlorosilane containing up to 2 mol per cent methyltrichlorosilane.

6. The step as in claim 4 wherein the solid, elastic methyl-substituted polysiloxane is the solid, elastic, higher molecular weight product obtained by condensing a lower molecular weight liquid, polymeric dimethylsiloxane containing up to 2 mol per cent copolymerized monomethylsiloxane with pyroboric acid.

7. A composition of matter exhibiting a substantial lack of nerve comprising a homogeneous mixture containing the following ingredients in the corresponding per cents by weight: (1) from 1 to 10 per cent of a solid, elastic, polymerized, methyl-substituted polysiloxane having an average ratio of from 1.98 to 2.0 methyl groups per silicon atom and obtained by condensing a liquid polymeric dimethylsiloxane containing up to 2 mol per cent copolymerized monomethylsiloxane, and (2) from 90 to 99 per cent of a solid, rubbery, hydrocarbon polymeric product of polymerization of a mass comprising, by weight, a major proportion of an isomonoolefin having less than 8 carbon atoms per molecule and a minor proportion of conjugated diolefin having from 4 to 8 carbon atoms per molecule.

8. A composition of matter as in claim 7 wherein the isomonoolefin is isobutylene and the diolefin is butadiene.

9. A composition of matter exhibiting a substantial lack of nerve comprising a homogeneous mixture containing the following ingredients in the corresponding per cents, by weight: (1) from 3 to 10 per cent of a solid, elastic, polymerized, methyl-substituted polysiloxane having an average ratio of from 1.98 to 2.0 methyl groups per silicon atom and obtained by condensing a liquid polymeric dimethylsiloxane containing up to 2 mol per cent copolymerized monomethylsiloxane, and (2) from 90 to 97 per cent of a solid, rubbery, hydrocarbon polymeric product of polymerization of a mass containing, by weight, 98 per cent isobutylene and 2 per cent butadiene.

MOYER M. SAFFORD.

REFERENCES CITED

The following references are of record in the file of this patent:

UNITED STATES PATENTS

| Number | Name | Date |
|---|---|---|
| 2,258,218 | Rochow | Oct. 7, 1941 |
| 2,356,128 | Thomas et al. | Aug. 22, 1944 |
| 2,392,713 | Wright | Jan. 8, 1946 |